US011934591B1

(12) United States Patent
Lee

(10) Patent No.: US 11,934,591 B1
(45) Date of Patent: Mar. 19, 2024

(54) MOUSE

(71) Applicant: Cheng Uei Precision Industry Co., LTD., New Taipei (TW)

(72) Inventor: Tsung-Shih Lee, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/211,588

(22) Filed: Jun. 19, 2023

(30) Foreign Application Priority Data

Nov. 8, 2022 (CN) .......................... 202222971768.6

(51) Int. Cl.
G06F 3/0354 (2013.01)
(52) U.S. Cl.
CPC ................. G06F 3/03543 (2013.01)
(58) Field of Classification Search
CPC .................................................. G06F 3/03543
See application file for complete search history.

(56) References Cited

U.S. PATENT DOCUMENTS

| 6,717,573 | B1* | 4/2004 | Shahoian | G06F 3/016 345/161 |
|---|---|---|---|---|
| 2018/0113521 | A1* | 4/2018 | Lai | G06F 3/03543 |
| 2019/0146600 | A1* | 5/2019 | Tsai | G06F 3/0202 345/163 |
| 2019/0250709 | A1* | 8/2019 | Wang | G06F 3/0338 |
| 2021/0208703 | A1* | 7/2021 | Tseng | G06F 3/0202 |
| 2021/0286449 | A1* | 9/2021 | Chiu | G06F 3/038 |
| 2021/0365129 | A1* | 11/2021 | Chen | G06F 3/03543 |

* cited by examiner

Primary Examiner — Ryan A Lubit
(74) Attorney, Agent, or Firm — Cheng-Ju Chiang

(57) ABSTRACT

A mouse includes a lower shell, an upper shell covered on the lower shell, a first elastic element, a second elastic element and a circuit board. The upper shell has a first button and a second button. A bottom surface of the first button extends downward to form a first pressing portion. A bottom surface of the second button extends downward to form a second pressing portion and a third pressing portion. One end of the first elastic element abuts against the first pressing portion to generate a first downward force. One end of the second elastic element abuts against the second pressing portion to form a second downward force. The other end of the second elastic element abuts against the third pressing portion to generate a resilience force. The first downward force is equal to a sum of the second downward force and the resilience force.

20 Claims, 17 Drawing Sheets

MOUSE

CROSS-REFERENCE TO RELATED APPLICATION

The present application is based on, and claims priority from, China Patent Application No. 202222971768.6, filed Nov. 8, 2022, the disclosure of which is hereby incorporated by reference herein in its entirety.

BACKGROUND OF THE INVENTION

1. Field of the Invention

The present invention generally relates to a mouse, and more particularly to a mouse still having the same feedback force without affecting a hand feeding of an operator when two micro switches of the mouse are located at different horizontal positions.

2. The Related Art

As is known to all, a computer has become an important working platform in people's daily lives. Current mouses and keyboards are essential computer input devices. Applications of the current mouses and the keyboards bring more conveniences for people to operate the computer to process data. Usually, the current mouse mostly uses two micro switches as contacts of a left button and a right button. A working principle of the current mouse is described as follows. When an external force is applied to the left button and the right button, a moving contact and a fixed contact collide or disconnect quickly on the left button and the right button, thereby generating a signal to achieve an operation control purpose of the current mouse. The two micro switches of the current mouse are disposed at the same horizontal line, the two micro switches are aligned along a direction from left to right, so that pressing distances of the two micro switches are generally the same to generate similar hand feelings.

However, an internal space of the current mouse is limited, so that the two micro switches of the current mouse are disposed at different horizontal lines, the two micro switches are unaligned along the direction from left to right. The two micro switches are arranged along a front-to-rear direction, the pressing distances of the two micro switches are different. Therefore, the hand feelings are different at the time of pressing the two micro switches of the current mouse.

Thus, it is essential to provide an innovative mouse, the innovative mouse still has the same feedback force without affecting a hand feeding of an operator when two micro switches of the innovative mouse are located at different horizontal positions.

SUMMARY OF THE INVENTION

An object of the present invention is to provide a mouse still having the same feedback force without affecting a hand feeding of an operator when two micro switches of the mouse are located at different horizontal positions. The mouse includes a lower shell, an upper shell, a first elastic element, a second elastic element and a circuit board. The upper shell is covered on the lower shell. A middle of the upper shell is spaced from the lower shell to form an accommodating space between the lower shell and the upper shell. A front end of the upper shell has a first button and a second button. A bottom surface of the first button extends downward to form a first pressing portion. A bottom surface of the second button extends downward to form a second pressing portion and a third pressing portion. The front end of the upper shell is closer to the first pressing portion of the first button than to the second pressing portion and the third pressing portion of the second button. The first elastic element is disposed to a bottom surface of the upper shell. The first elastic element is corresponding to the first button. One end of the first elastic element abuts against a lower wall of an inside of the first pressing portion to generate a first downward force. The second elastic element is disposed to the bottom surface of the upper shell. The second elastic element is corresponding to the second button. One end of the second elastic element abuts against a lower wall of an inside of the second pressing portion to form a second downward force. The other end of the second elastic element abuts against a top wall of an inside of the third pressing portion to generate a resilience force. The circuit board is fastened in the accommodating space. The circuit board is equipped with two electronic switches. The two electronic switches are mounted on two opposite sides of a front end of a top surface of the circuit board. The two electronic switches are corresponding to the first pressing portion and the third pressing portion. The first downward force is equal to a sum of the second downward force and the resilience force.

Another object of the present invention is to provide a mouse. The mouse includes a lower shell, an upper shell, a first elastic element, a second elastic element and a circuit board. The upper shell is covered on the lower shell. A middle of the upper shell is spaced from the lower shell to form an accommodating space between the lower shell and the upper shell. A front end of the upper shell has a first button and a second button. The upper shell has a main body. The main body is disposed to a bottom surface of the first button and a bottom surface of the second button. The bottom surface of the first button extends downward to form a first pressing portion. The bottom surface of the second button extends downward to form a second pressing portion and a third pressing portion. An inside of the first pressing portion forms a first space penetrating through a rear of the first pressing portion, an inside of the second pressing portion forms a second space penetrating through a rear of the second pressing portion, and an inside of the third pressing portion forms a third space penetrating through a rear of the third pressing portion. The front end of the upper shell is closer to the first pressing portion of the first button than to the second pressing portion and the third pressing portion. The first elastic element is disposed to a bottom surface of the upper shell. The first elastic element is corresponding to the first button. The first elastic element has a first elastic body. The first elastic body is mounted under one side of the main body which is disposed to the bottom surface of the first button. A bottom end of the first elastic body has a first abutting end. One end of the first abutting end abuts against an inner surface of a lower wall of the first space of the first pressing portion to generate a first downward force. The second elastic element is disposed to the bottom surface of the upper shell. The second elastic element is corresponding to the second button. The second elastic element has a second elastic body. The second elastic body is mounted under the other side of the main body which is disposed to the bottom surface of the second button. A top end of the second elastic body has a second abutting end. A free portion of a bottom end of the second elastic body extends downward, then extends frontward and further slantwise extends frontward and upward to form a flexible arm. A tail portion of the second abutting end abuts against an inner surface of a lower wall of the second space of the second pressing portion to generate a second downward force. One end of the flexible arm abuts against an inner surface of a top wall of the third space of the third pressing portion to generate a resilience force. The circuit board is fastened in the accommodating space. The circuit board is equipped with two electronic switches. The two electronic switches are mounted on two opposite sides of a front end of a top surface of the circuit board. The two electronic switches are corresponding to the first pressing portion and the third pressing portion. The first downward force is equal to a sum of the second downward force and the resilience force.

Another object of the present invention is to provide a mouse. The mouse includes a lower shell, an upper shell, a first elastic element, a second elastic element and a circuit board. The upper shell is covered on the lower shell. A middle of the upper shell is spaced from the lower shell to form an accommodating space between the lower shell and the upper shell. A front end of the upper shell has a first button and a second button. The upper shell has a main body. The main body is disposed to a bottom surface of the first button and a bottom surface of the second button. The bottom surface of the first button extends downward to form a first pressing portion. The bottom surface of the second button extends downward to form a second pressing portion and a third pressing portion. An inside of the first pressing portion forms a first space penetrating through a rear of the first pressing portion, an inside of the second pressing portion forms a second space penetrating through a rear of the second pressing portion, and an inside of the third pressing portion forms a third space penetrating through a rear of the third pressing portion. The front end of the upper shell is closer to the first pressing portion of the first button than to the second pressing portion and the third pressing portion. The first elastic element is disposed to a bottom surface of the upper shell. The first elastic element is corresponding to the first button. The first elastic element has a first elastic body. The first elastic body is mounted under one side of the main body which is disposed to the bottom surface of the first button. A bottom end of the first elastic body has a first abutting end. One end of the first abutting end abuts against an inner surface of a lower wall of the first space of the first pressing portion to generate a first downward force. The second elastic element is disposed to the bottom surface of the upper shell. The second elastic element is corresponding to the second button. The second elastic element has a second elastic body. The second elastic body is mounted under the other side of the main body which is disposed to the bottom surface of the second button. A top end of the second elastic body has a second abutting end. A free portion of a bottom end of the second elastic body extends downward, then extends frontward, further slantwise extends upward and frontward, later extends frontward and is bent inward and towards the second abutting end to form an elastic arm. A tail portion of the second abutting end abuts against an inner surface of a lower wall of the second space of the second pressing portion to generate a second downward force. One end of the elastic arm abuts against an inner surface of a top wall of the third space of the third pressing portion to generate a resilience force. The circuit board is fastened in the accommodating space. The circuit board is equipped with two electronic switches. The two electronic switches are mounted on two opposite sides of a front end of a top surface of the circuit board. The two electronic switches are corresponding to the first pressing portion and the third pressing portion. The first downward force is equal to a sum of the second downward force and the resilience force.

As described above, the mouse has an innovative structure design, a free end of a second inclining portion of the first abutting end of the first elastic element abuts against the inner surface of the lower wall of the first space of the first pressing portion to generate the first downward force, one end of a fifth inclining portion of the second abutting end of the second elastic element abuts against the inner surface of the lower wall of the second space of the second pressing portion to generate the second downward force, and the one end of the flexible arm of the second elastic element abuts against the inner surface of the top wall of the third space of the third pressing portion to generate the resilience force, the first downward force is equal to the sum of the second downward force and the resilience force. As a result, when the first button which is a left button and the second button which is a right button of the mouse are located at different horizontal positions, namely the first button and the second button are unaligned along a left and right direction, the first button and the second button still have the same feedback force, so that a hand feeling of an operator is without being affected.

BRIEF DESCRIPTION OF THE DRAWINGS

The present invention will be apparent to those skilled in the art by reading the following description, with reference to the attached drawings, in which.

DETAILED DESCRIPTION OF THE
PREFERRED EMBODIMENT

Figure 1:
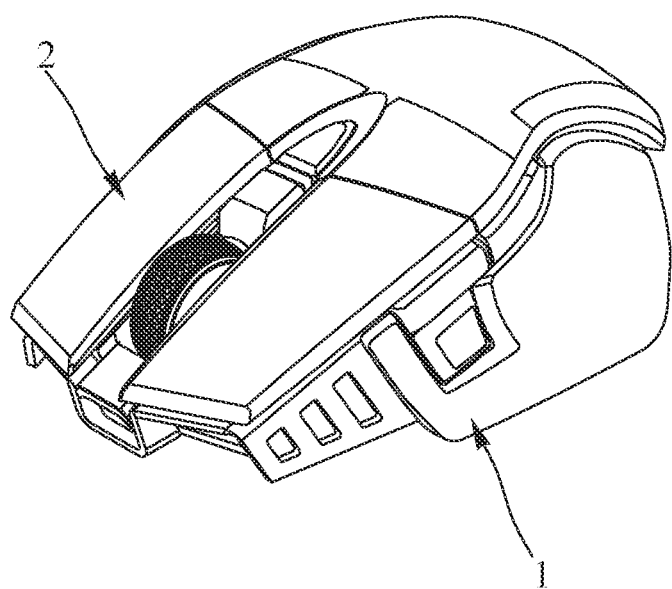
FIG. 1 is a perspective view of a mouse in accordance with a first preferred embodiment of the present invention.
Figure 2:
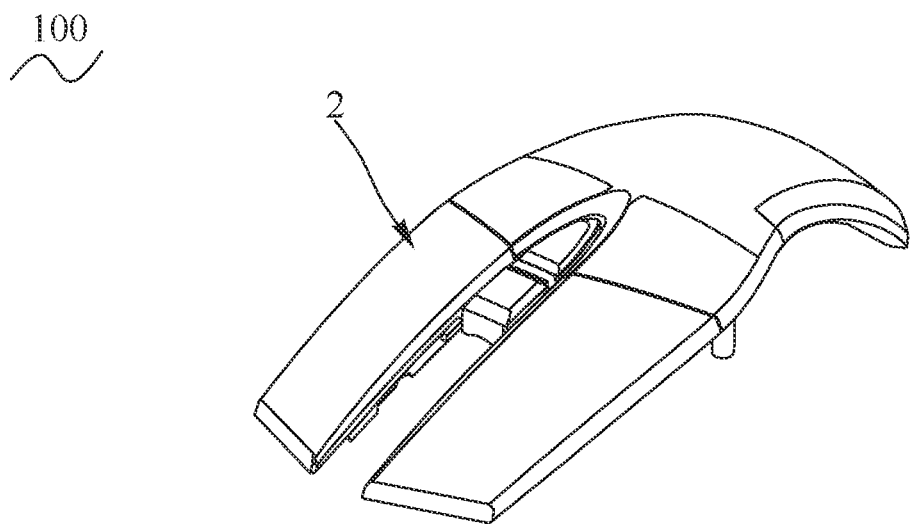
FIG. 2 is a partially exploded view of the mouse of FIG. 1.
Figure 2:
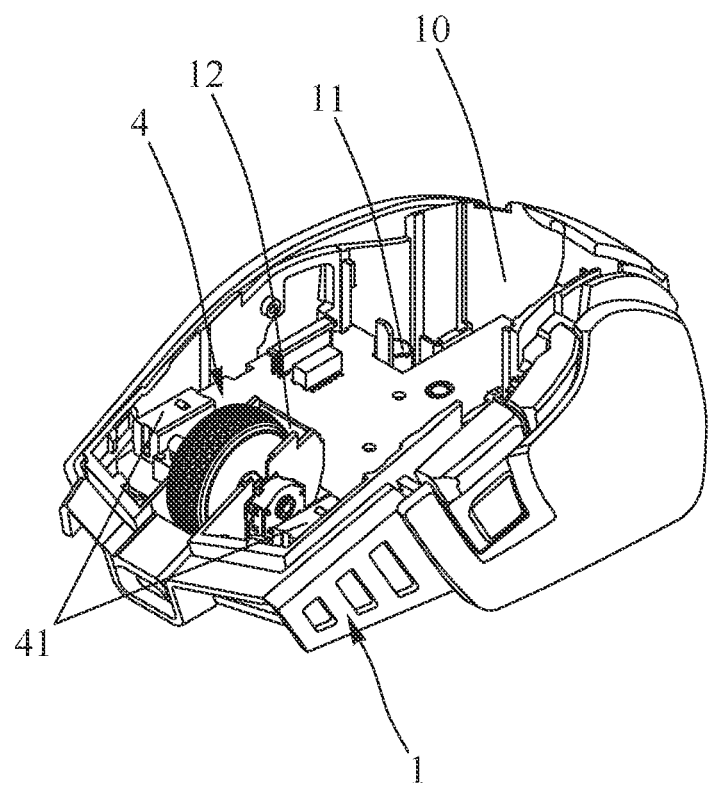
Figure 3:
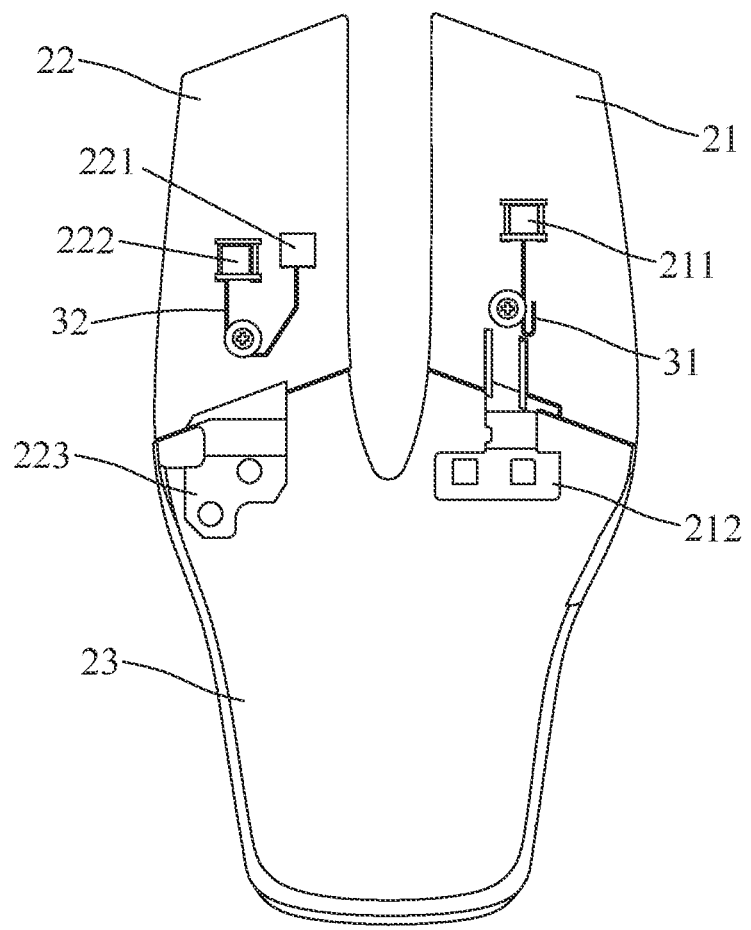
FIG. 3 is a partially perspective view of the mouse of FIG. 1.
Figure 4:
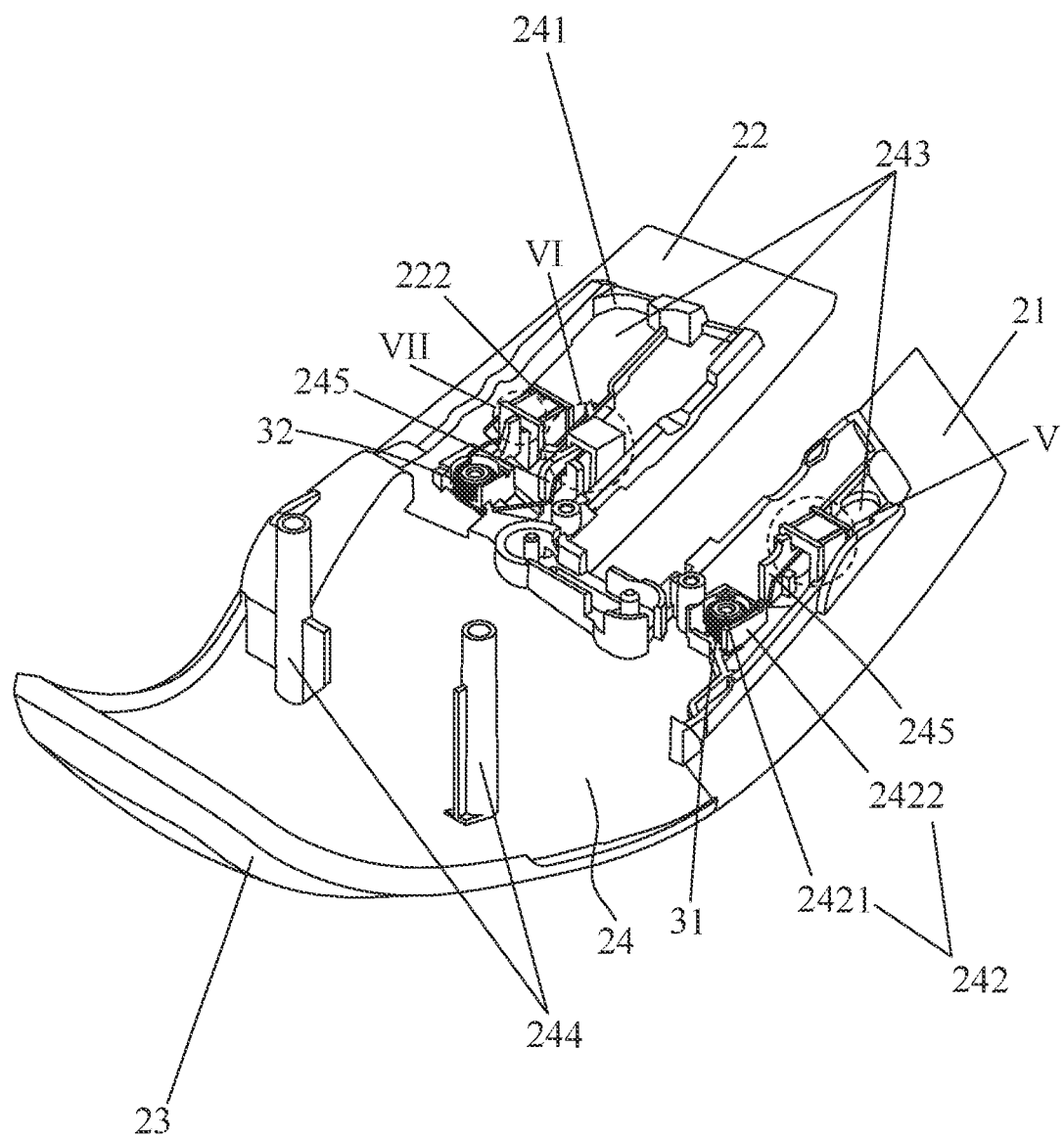
FIG. 4 is another partially perspective view of the mouse of FIG. 1.
Figure 5:
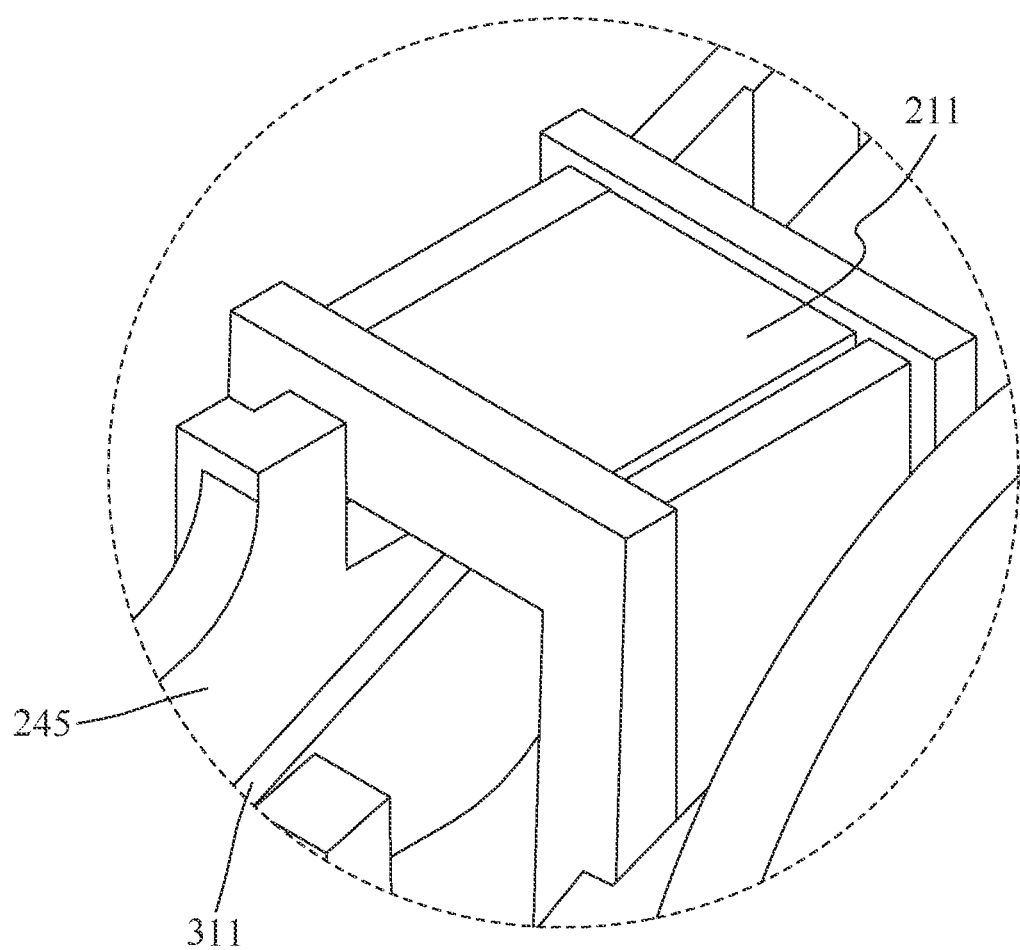
FIG. 5 is an enlarged view of an encircled portion V of the mouse of FIG. 4.
Figure 6:
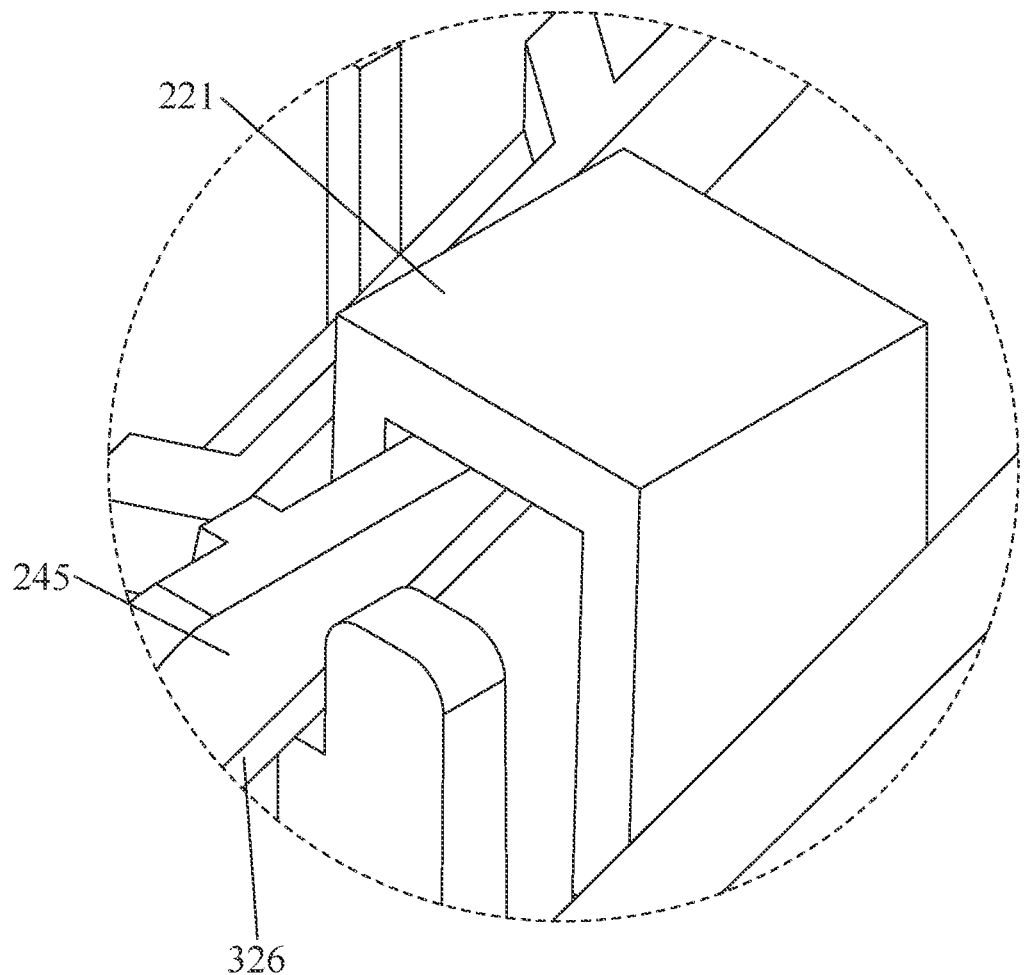
FIG. 6 is an enlarged view of an encircled portion VI of the mouse of FIG. 4.
Figure 7:
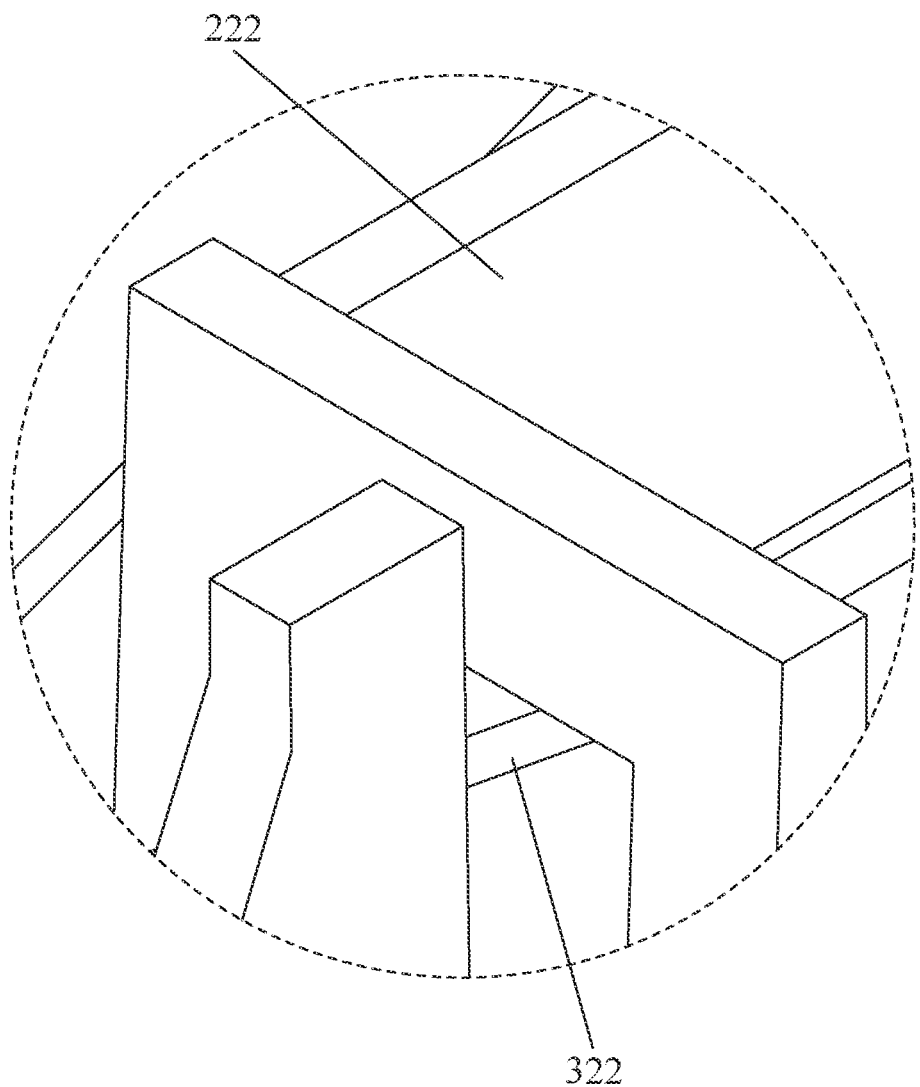
FIG. 7 is an enlarged view of an encircled portion VII of the mouse of FIG. 4.
Figure 16:
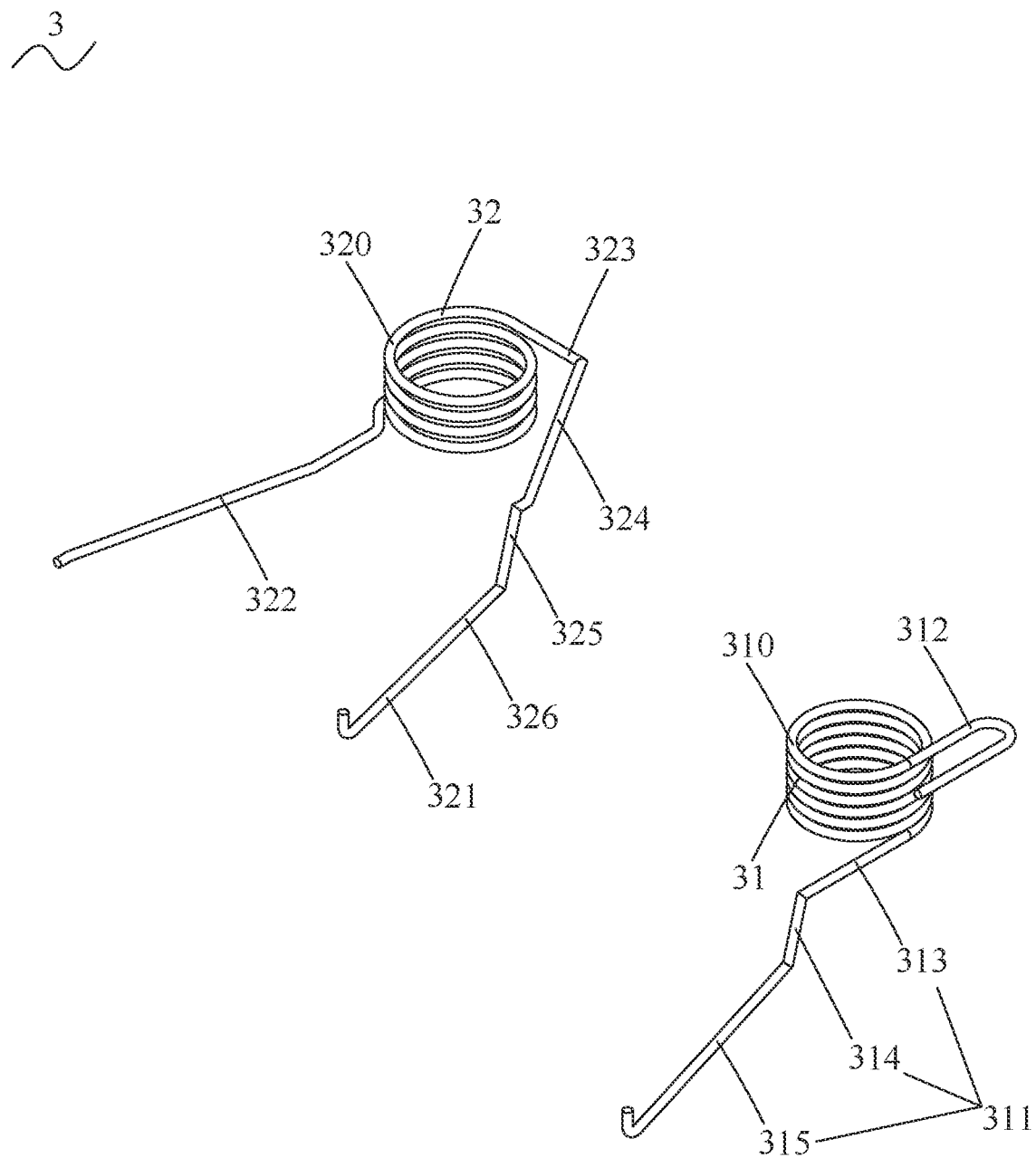
FIG. 16 is a perspective view of an elastic element assembly of the mouse in accordance with the first preferred embodiment of the present invention.
Figure 17:
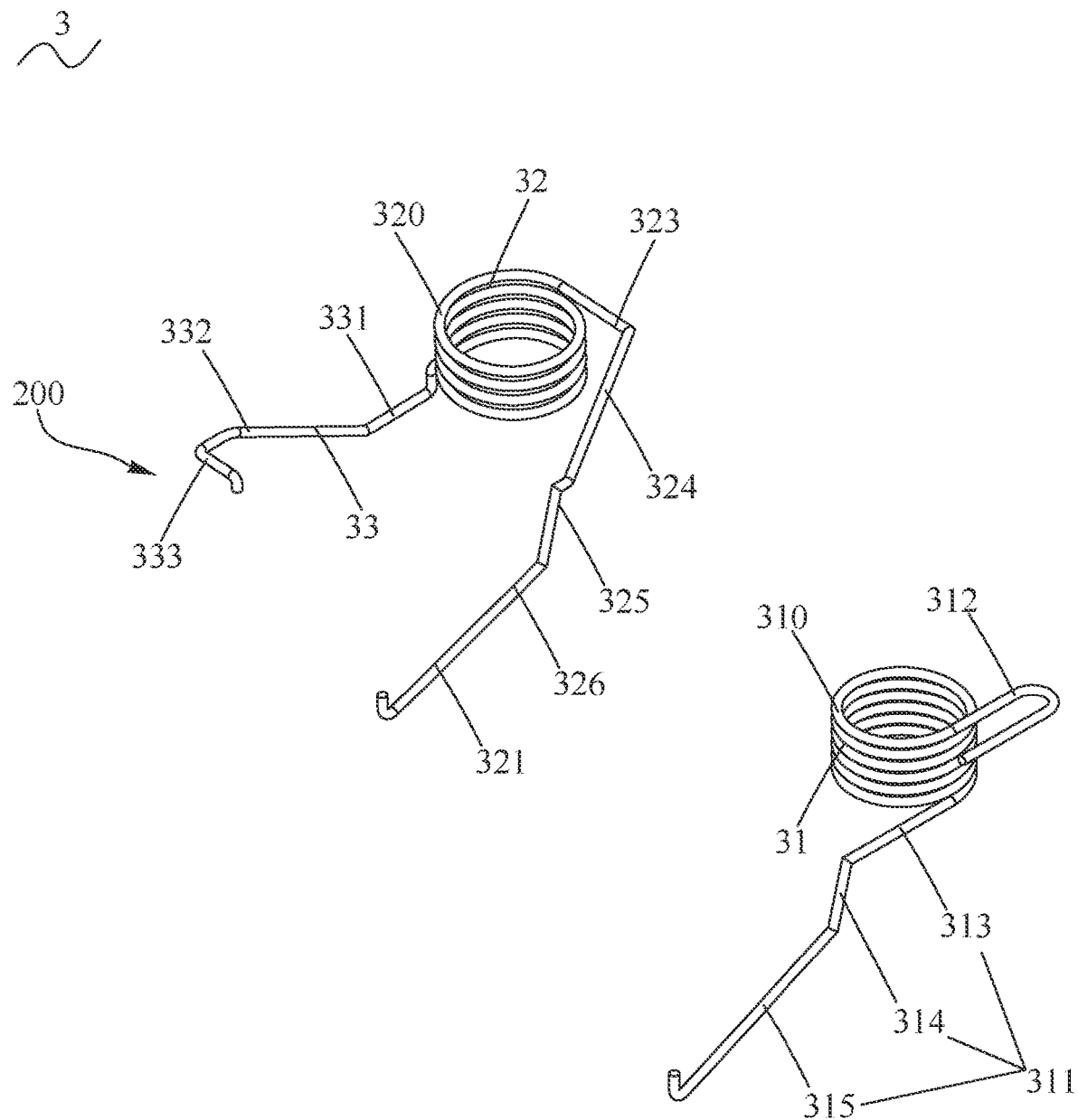
FIG. 17 is a perspective view of the elastic element assembly of the mouse in accordance with a second preferred embodiment of the present invention.

With reference to FIG. 1, FIG. 2 and FIG. 16, a mouse 100 in accordance with a first preferred embodiment of the present invention is shown. The mouse 100 includes a lower shell 1, an upper shell 2, an elastic element assembly 3 and a circuit board 4.

The upper shell 2 is covered on the lower shell 1. The elastic element assembly 3 is disposed to a bottom surface of the upper shell 2. The circuit board 4 is positioned on a top surface of a middle of the lower shell 1. The circuit board 4 is disposed between the lower shell 1 and the upper shell 2. The elastic element assembly 3 is disposed to a top surface of the circuit board 4.

Figure 8:
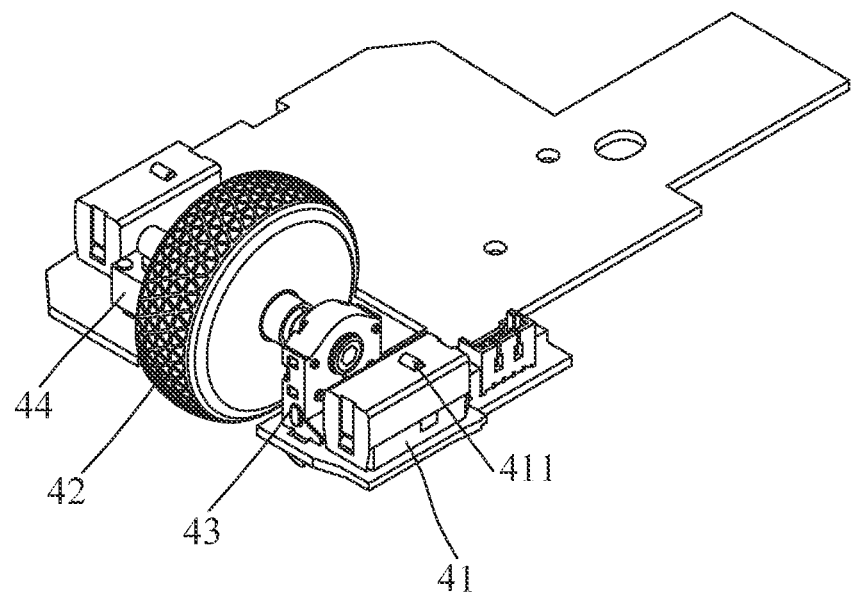
FIG. 8 is a perspective view of a circuit board of the mouse of FIG. 1.
Figure 9:
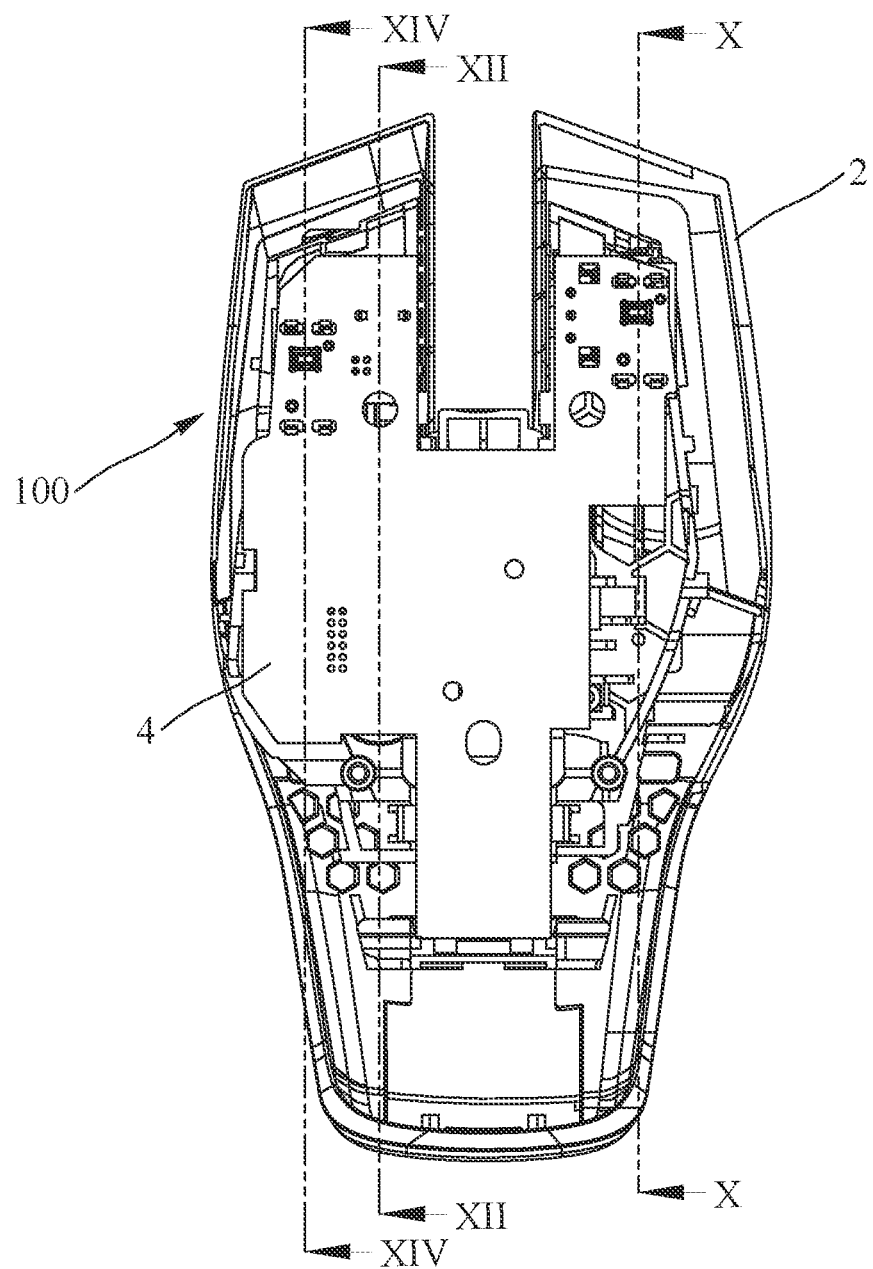
FIG. 9 is a partial assembling view of the mouse of FIG. 1.
Figure 10:
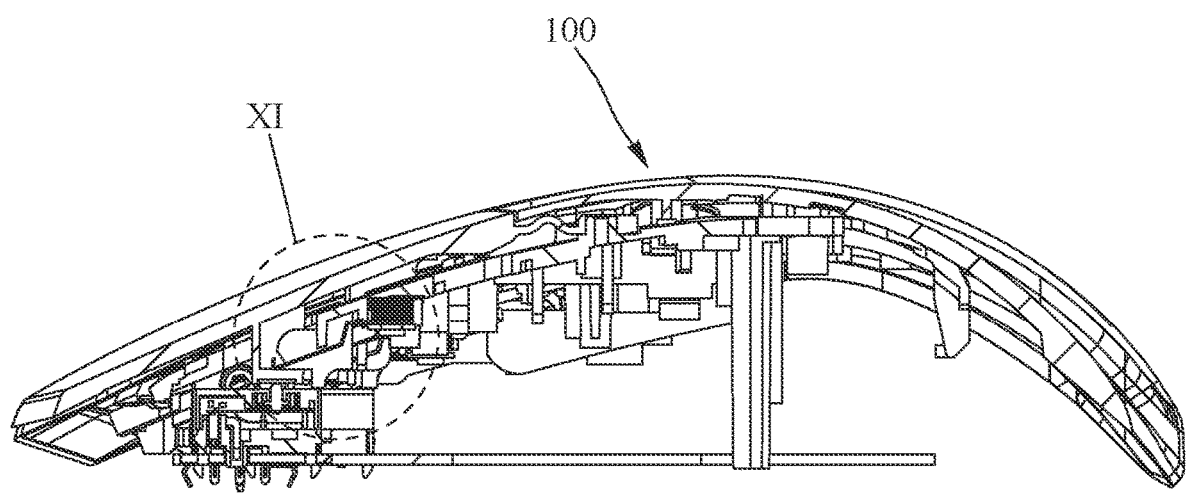
FIG. 10 is a sectional view of the mouse along a line X-X of FIG. 9.
Figure 11:
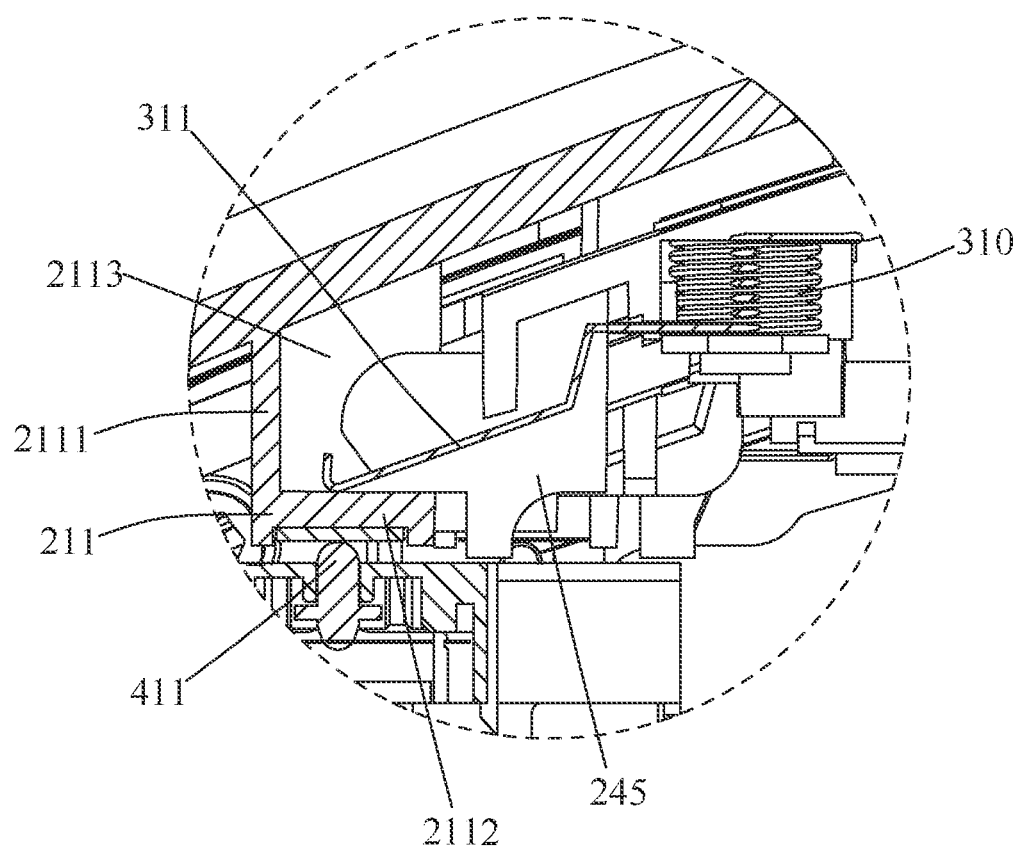
FIG. 11 is an enlarged view of an encircled portion XI of the mouse of FIG. 10.
Figure 12:
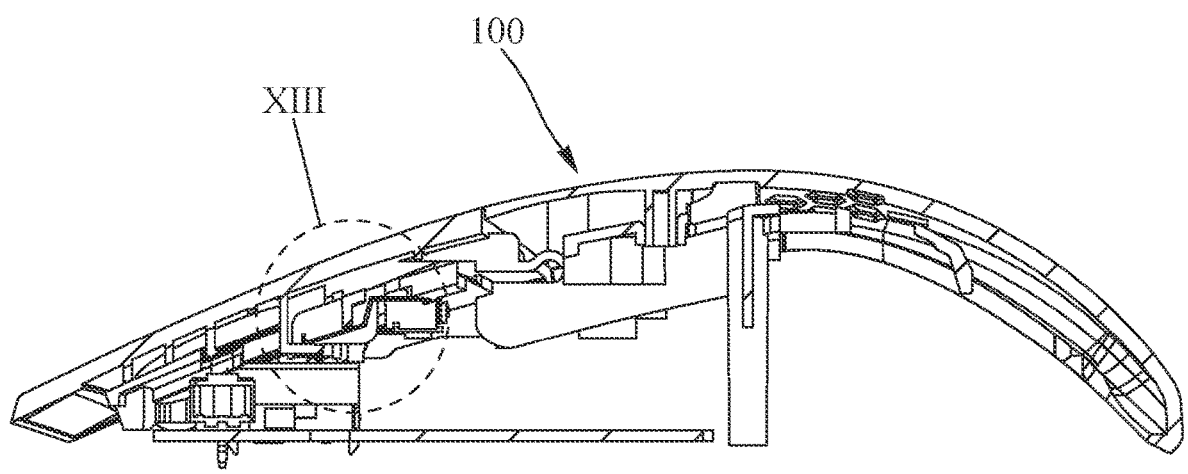
FIG. 12 is a sectional view of the mouse along a line XII-XII of FIG. 9.
Figure 13:
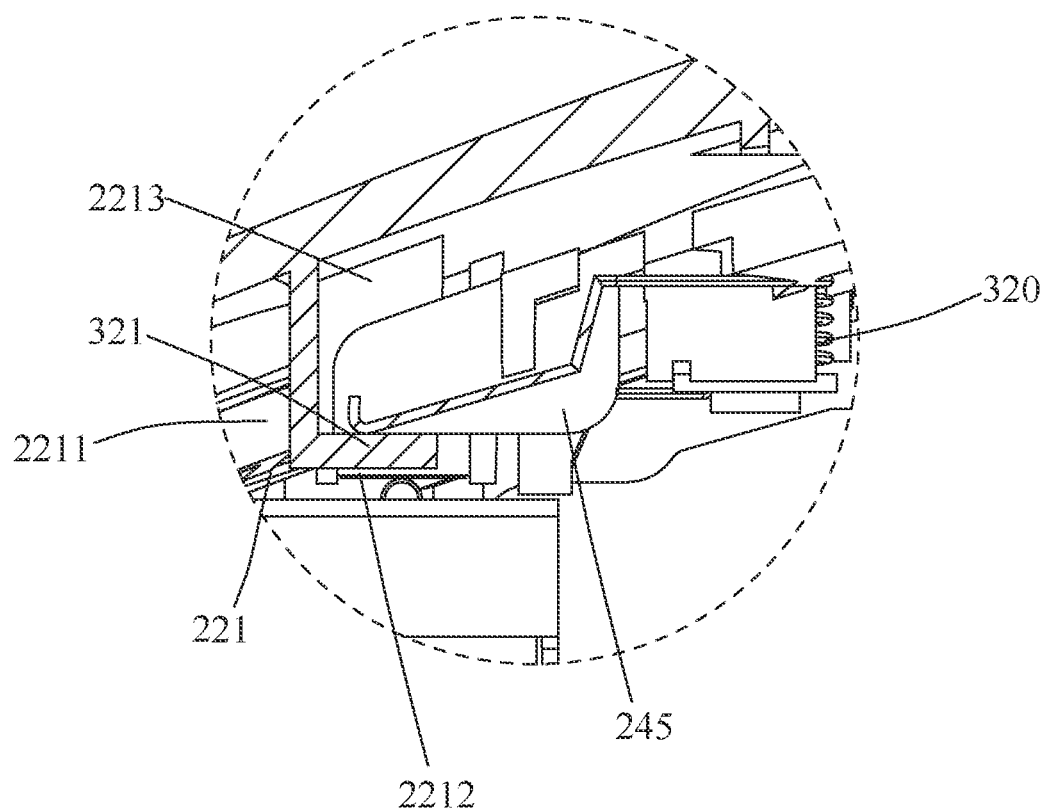
FIG. 13 is an enlarged view of an encircled portion XIII of the mouse of FIG. 12.
Figure 14:
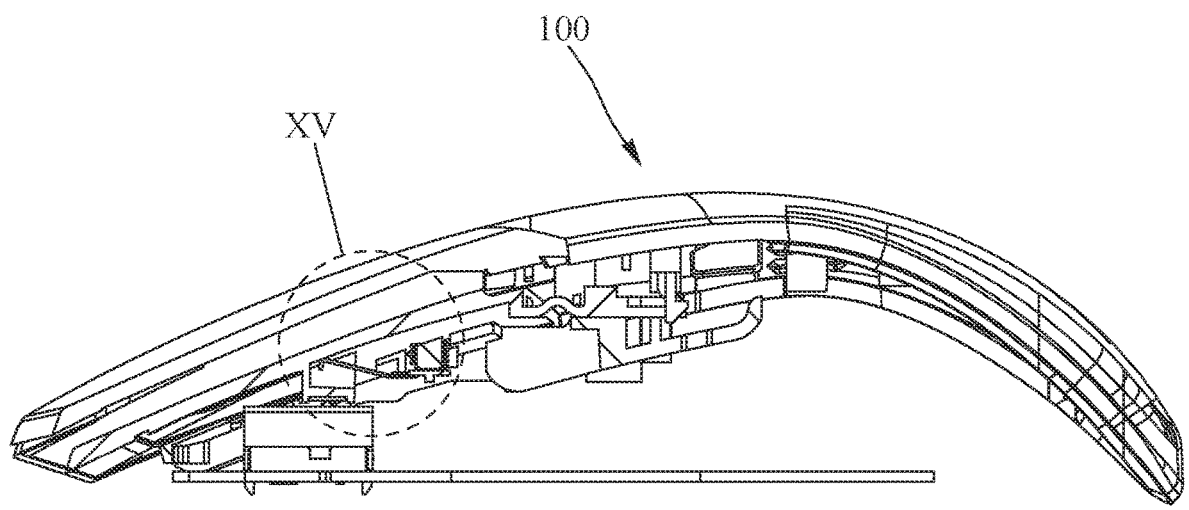
FIG. 14 is a sectional view of the mouse along a line XIV-XIV of FIG. 9.
Figure 15:
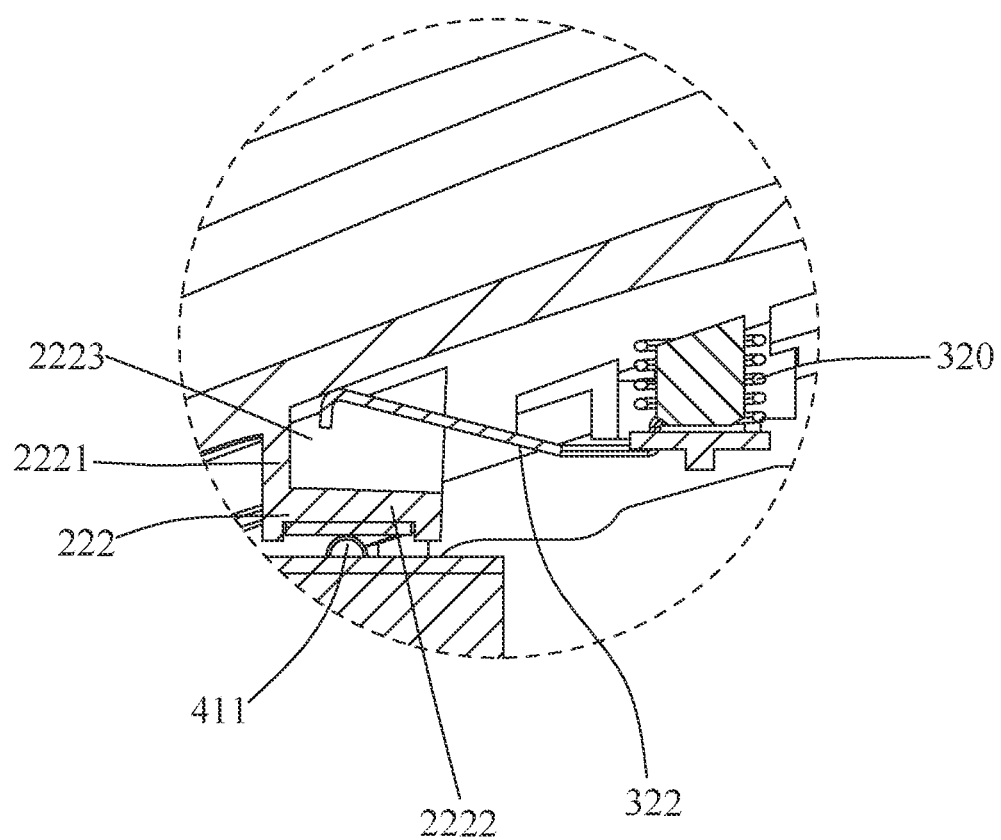
FIG. 15 is an enlarged view of an encircled portion XV of the mouse of FIG. 14.

Referring to FIG. 2 and FIG. 8, the lower shell 1 has a location hole 11 and a receiving groove 12. A rear end of the lower shell 1 has the location hole 11 penetrating through a bottom surface of the lower shell 1. In the first preferred embodiment, the lower shell 1 has two location holes 11. The two location holes 11 are transversely disposed at the rear end of the lower shell 1. The location hole 11 is corresponding to a corresponding mechanism of the upper shell 2 to realize that the upper shell 2 is located to the lower shell 1, and the upper shell 2 is fixed to the lower shell 1. A middle of a front end of the lower shell 1 has the receiving groove 12 penetrating through a top surface of the lower shell 1. A corresponding mechanism of the circuit board 4 is disposed in the receiving groove 12.

Referring to FIG. 1 to FIG. 4, the lower shell 1 is shown as a hollow shape with a top of the lower shell 1 being opened freely. A top of the upper shell 2 is arched upward and a bottom of the upper shell 2 is opened freely. A middle of the upper shell 2 is spaced from the lower shell 1 to form an accommodating space 10 between the lower shell 1 and the upper shell 2. The circuit board 4 is fastened in the accommodating space 10. The upper shell 2 has a first button 21, a second button 22, a grip portion 23 and a main body 24. A front end of the upper shell 2 has the first button 21 and the second button 22. The main body 24 is disposed to a bottom surface of the first button 21, a bottom surface of the second button 22 and a bottom surface of the grip portion 23. The first button 21 and the second button 22 are disposed to two sides of a front end of the grip portion 23.

Referring to FIG. 1 to FIG. 15, the first button 21 has a first pressing portion 211 and a first connecting portion 212. A substantial middle of the bottom surface of the first button 21 extends downward to form the first pressing portion 211. A corresponding mechanism of the elastic element assembly 3 is disposed in the first pressing portion 211 of the first button 21. A bottom surface of the first pressing portion 211 abuts against one side of the circuit board 4. A rear end of the first button 21 extends rearward to form the first connecting portion 212. The first connecting portion 212 is connected with the bottom surface of the grip portion 23. The first connecting portion 212 is disposed between the grip portion 23 and the main body 24.

The first pressing portion 211 has a first connecting wall 2111 and a first bottom wall 2112. The substantial middle of the bottom surface of the first button 21 extends downward to form the first connecting wall 2111. The first connecting wall 2111 is a U shape seen from a bottom view. The first bottom wall 2112 is connected with a bottom of the first connecting wall 2111. The first button 21 has a first space 2113 surrounded among the first connecting wall 2111, the first bottom wall 2112 and the bottom surface of the first button 21.

The second button 22 has a second pressing portion 221, a third pressing portion 222 and a second connecting portion 223. Two sides of the bottom surface of the second button 22 extend downward to form the second pressing portion 221 and the third pressing portion 222. The second pressing portion 221 is disposed between the first pressing portion 211 of the first button 21 and the third pressing portion 222 of the second button 22. The second pressing portion 221 and the third pressing portion 222 are roughly on the same line. The second pressing portion 221 and the third pressing portion 222 are roughly aligned along a left and right direction. The second pressing portion 221, the third pressing portion 222 and the first pressing portion 211 of the first button 21 are located at different lines. The second pressing portion 221, the third pressing portion 222 and the first pressing portion 211 of the first button 21 are unaligned along the left and right direction. A longitudinal distance between the first pressing portion 211 of the first button 21 and the grip portion 23 is further than a longitudinal distance between the second pressing portion 221 and the grip portion 23, and the longitudinal distance between the first pressing portion 211 of the first button 21 and the grip portion 23 is further than a longitudinal direction between the third pressing portion 222 and the grip portion 23.

The corresponding mechanism of the elastic element assembly 3 is disposed in the second pressing portion 221 and the third pressing portion 222. A bottom surface of the third pressing portion 222 abuts against the corresponding mechanism of the circuit board 4. In the first preferred embodiment, the front end of the upper shell 2 is closer to the first pressing portion 211 of the first button 21 than to the second pressing portion 221 and the third pressing portion 222 of the second button 22. In a concrete implementation, the front end of the upper shell 2 is without being limited to be closer to the first pressing portion 211 of the first button 21 than to the second pressing portion 221 and the third pressing portion 222. A rear end of the second button 22 extends rearward to form the second connecting portion 223. The second connecting portion 223 is connected with the bottom surface of the grip portion 23. The second connecting portion 223 is disposed between the grip portion 23 and the main body 24.

The second pressing portion 221 has a second connecting wall 2211 and a second bottom wall 2212. One side of the bottom surface of the second button 22 extends downward to form the second connecting wall 2211. The second connecting wall 2211 is another U shape seen from the bottom view. The second bottom wall 2212 is connected with a bottom of the second connecting wall 2211. The second button 22 has a second space 2213 surrounded among the second connecting wall 2211, the second bottom wall 2212 and the bottom surface of the second button 22.

The third pressing portion 222 has a third connecting wall 2221 and a third bottom wall 2222. The other side of the bottom surface of the second button 22 extends downward to form the third connecting wall 2221. The third connecting wall 2221 is still another U shape seen from the bottom view. The third bottom wall 2222 is connected with a bottom of the third connecting wall 2221. The second button 22 has a third space 2223 surrounded among the third connecting wall 2221, the third bottom wall 2222 and the bottom surface of the second button 22. In the first preferred embodiment, an inside of the first pressing portion 211 forms the first space 2113 penetrating through a rear of the first pressing portion 211, an inside of the second pressing portion 221 forms the second space 2213 penetrating through a rear of the second pressing portion 221, and an inside of the third pressing portion 222 forms the third space 2223 penetrating through a rear of the third pressing portion 222.

The main body 24 has two buffering portions 241, two location portions 242, a plurality of perforations 243, a location pillar 244 and two location plates 245. In the first preferred embodiment, the main body 24 has two location pillars 244. Two opposite sides of a front end of a bottom surface of the main body 24 extend frontward to form the two buffering portions 241, respectively. The two buffering portions 241 are corresponding to the first button 21 and the second button 22, respectively. The two location portions 242 are disposed to two rear ends of the two buffering portions 241. The elastic element assembly 3 is mounted in the two location portions 242.

Two front ends of the two buffering portions 241 have the plurality of the perforations 243. The plurality of the perforations 243 penetrate through top surfaces and bottom surfaces of the two buffering portions 241. The plurality of the perforations 243 are corresponding to positions of the first pressing portion 211, the second pressing portion 221 and the third pressing portion 222. Two perforations 243 which are corresponding to the second button 22 are abreast disposed. The first pressing portion 211 passes through the perforation 243 which is corresponding to the first button 21. The second pressing portion 221 passes through one perforation 243 which is corresponding to the second button 22. The third pressing portion 222 passes through the other perforation 243 which is corresponding to the second button 22.

A bottom surface of the main body 24 extends downward to form the location pillar 244. Two sides of the bottom surface of the main body 24 extend downward to form the two location pillars 244. A quantity of the location pillar 244 is corresponding to a quantity of the location hole 11 of the lower shell 1. The location pillar 244 is fastened in the location hole 11 of the lower shell 1 to realize that the upper shell 2 is located to the lower shell 1, and the upper shell 2 is fixed to the lower shell 1. Two rear ends of two bottom surfaces of the two buffering portions 241 extend downward and frontward to form the two location plates 245. The two location plates 245 are disposed in front of the two location portions 242. Front ends of the two location plates 245 are disposed in the first pressing portion 211 and the second pressing portion 221, respectively. The two location plates 245 are disposed in the two perforations 243 which are corresponding to the first pressing portion 211 and the second pressing portion 221, respectively.

Each location portion 242 has a location shaft 2421 and a periphery wall 2422. The rear end of the bottom surface of each buffering portion 241 of the main body 24 extends downward to form the location shaft 2421 and the periphery wall 2422. The location shaft 2421 is surrounded by the periphery wall 2422. The periphery wall 2422 is spaced a distance from the location shaft 2421.

Referring to FIG. 1 to FIG. 16, the elastic element assembly 3 is sleeved around the location shafts 2421 of the two location portions 242. The elastic element assembly 3 is surrounded by the two periphery walls 2422 of the two location portions 242. The elastic element assembly 3 includes a first elastic element 31 and a second elastic element 32. The first elastic element 31 and the second elastic element 32 are mounted around the two location portions 242. The first elastic element 31 is disposed to the bottom surface of the first button 21. The first elastic element 31 is corresponding to the first button 21. The second elastic element 32 is disposed to the bottom surface of the second button 22. The second elastic element 32 is corresponding to the second button 22. The first elastic element 31 has a first elastic body 310, a first abutting end 311 and a fastening end 312. The first elastic body 310 is a spiral shape. The first elastic body 310 is mounted under one side of the main body 24 which is disposed to the bottom surface of the first button 21. The first elastic body 310 is mounted around the location shaft 2421 of the location portion 242 of the main body 24 which is disposed to the bottom surface of the first button 21. The mouse 100 further includes a screw (not shown). The screw is fastened to the location shaft 2421 to prevent the first elastic body 310 being separated from the location shaft 2421.

A bottom end of the first elastic body 310 has the first abutting end 311. A free end of the first abutting end 311 abuts against an inner surface of the first bottom wall 2112 of the first pressing portion 211. The first abutting end 311 has a first extending portion 313, a first inclining portion 314 and a second inclining portion 315. A free portion of the bottom end of the first elastic body 310 extends frontward to form the first extending portion 313. The first extending portion 313 extends frontward and penetrates through a front of the periphery wall 2422 of the location portion 242 of the main body 24 which is disposed to the bottom surface of the first button 21. One end of the first extending portion 313 slantwise extends frontward and downward to form the first inclining portion 314. One end of the first inclining portion 314 slantwise extends frontward and downward to form the second inclining portion 315. The first inclining portion 314 and the second inclining portion 315 are disposed at an outer surface of one location plate 245 of the upper shell 2 which is disposed to the bottom surface of the first button 21. The first inclining portion 314 and the second inclining portion 315 abut against the same outer surface of the location plate 245 of the main body 24 which is disposed to the bottom surface of the first button 21 of the upper shell 2. The second inclining portion 315 is disposed in the first space 2113 of the first pressing portion 211. One end of the first elastic element 31 abuts against a lower wall of the inside of the first pressing portion 211 to generate a first downward force F1. One end of the first abutting end 311 abuts against the lower wall of the inside of the first pressing portion 211 to generate the first downward force F1. The one end of the first abutting end 311 abuts against an inner surface of a lower wall of the first space 2113 of the first pressing portion 211 to generate the first downward force F1. A free end of the second inclining portion 315 of the first abutting end 311 abuts against the inner surface of the lower wall of the first space 2113 of the first pressing portion 211 to generate the first downward force F1.

When the first downward force F1 is formed, the free end of the second inclining portion 315 abuts against the inner surface of the first bottom wall 2112 of the first pressing portion 211. A free portion of a top end of the first elastic body 310 extends rearward and is curved frontward to form the fastening end 312. The fastening end 312 clamps an outside of the periphery wall 2422 of the location portion 242 of the main body 24 which is disposed to the bottom surface of the first button 21 to realize that the first elastic element 31 is located to the upper shell 2, and the first elastic element 31 is fixed to the upper shell 2. The fastening end 312 abuts against a bottom surface of the main body 24. In the first preferred embodiment, the fastening end 312 is a U-shaped structure. In the first preferred embodiment, the first abutting end 311 and the fastening end 312 are located at the same side of the first elastic body 310.

Referring to FIG. 3, FIG. 5, FIG. 8 and FIG. 9, the second elastic element 32 has a second elastic body 320, a second abutting end 321 and a flexible arm 322. The second elastic body 320 is mounted under the other side of the main body 24 which is disposed to the bottom surface of the second button 22. The second elastic body 320 is mounted around the location shaft 2421 of the location portion 242 of the main body 24 which is disposed to the bottom surface of the second button 22. The screw is fastened to the location shaft 2421 of the location portion 242 of the main body 24 which is disposed to the bottom surface of the second button 22 to prevent the second elastic body 320 being separated from the location shaft 2421 of the location portion 242 of the main body 24 which is disposed to the bottom surface of the second button 22. A top end of the second elastic body 320 has the second abutting end 321. A tail portion of the second abutting end 321 abuts against an inner surface of a lower wall of the second space 2213 of the second pressing portion 221 to generate a second downward force F2. The second abutting end 321 has a second extending portion 323, a third inclining portion 324, a fourth inclining portion 325 and a fifth inclining portion 326.

A free portion of the top end of the second elastic body 320 extends outward and towards the first elastic element 31 to form the second extending portion 323. The second extending portion 323 is disposed to a rear end of the periphery wall 2422 of the location portion 242 of the main body 24 which is disposed to the bottom surface of the second button 22 of the upper shell 2. A free end of the second extending portion 323 slantwise extends outward and frontward to form the third inclining portion 324. A front end of the third inclining portion 324 extends frontward and then slantwise extends downward and frontward to form the fourth inclining portion 325. A front end of the fourth inclining portion 325 slantwise extends frontward and downward to form the fifth inclining portion 326.

The third inclining portion 324 abuts against the bottom surface of the main body 24. The fourth inclining portion 325 and the fifth inclining portion 326 are disposed at an outer surface of the location plate 245 of the main body 24 of the upper shell 2 which is disposed to the bottom surface of the second button 22. The fourth inclining portion 325 and the fifth inclining portion 326 abut against the same outer surface of the location plate 245 of the main body 24 of the upper shell 2 which is disposed to the bottom surface of the second button 22. The fifth inclining portion 326 enters the second space 2213 of the second pressing portion 221. The fifth inclining portion 326 is disposed in the second space 2213 of the second pressing portion 221. One end of the second elastic element 32 abuts against a lower wall of an inside of the second pressing portion 221 to form the second downward force F2. One end of the fifth inclining portion 326 of the second abutting end 321 abuts against the inner surface of the lower wall of the second space 2213 of the second pressing portion 221 to generate the second downward force F2. When the second downward force F2 is formed, the one end of the fifth inclining portion 326 of the second abutting end 321 abuts against a top surface of the second bottom wall 2212 of the second pressing portion 221.

A free portion of a bottom end of the second elastic body 320 extends downward, then extends frontward and further slantwise extends frontward and upward to form the flexible arm 322. The flexible arm 322 penetrates through a bottom surface of the periphery wall 2422 of the location portion 242 which is disposed to the bottom surface of the second button 22, and then the flexible arm 322 is disposed in the third space 2223 of the third pressing portion 222. The other end of the second elastic element 32 abuts against a top wall of an inside of the third pressing portion 222 to generate a resilience force F3. One end of the flexible arm 322 abuts against an inner surface of a top wall of the third space 2223 of the third pressing portion 222 to generate the resilience force F3.

In the first preferred embodiment, the first downward force F1 is greater than the second downward force F2. The first downward force F1 is equal to a sum of the second downward force F2 and the resilience force F3. The first downward force F1 of the first elastic element 31, the second downward force F2 of the second elastic element 32 and the resilience force F3 of the second elastic element 32 satisfy a following condition: F1=F2+F3. Therefore, when the first button 21 which is a left button and the second button 22 which is a right button of the mouse 100 are located at different horizontal positions, namely the first button 21 and the second button 22 are unaligned along the left and right direction, the first button 21 and the second button 22 still have the same feedback force, so that a hand feeling of an operator is without being affected.

In the first preferred embodiment, the first abutting end 311 and the second abutting end 321 are located at the two outer surfaces of the two location plates 245 of the main body 24 of the upper shell 2. The two outer surfaces of the two location plates 245 of the main body 24 of the upper shell 2 are towards the same direction. The second abutting end 321 and the flexible arm 322 are disposed to two opposite sides of the second elastic body 320, respectively. The first elastic body 310 and the second elastic body 320 are compression springs.

Referring to FIG. 1 to FIG. 16, the circuit board 4 is equipped with two electronic switches 41, a wheel button 42, an encoder 43 and a micro switch 44. The two electronic switches 41 are mounted on two opposite sides of the front end of a top surface of the circuit board 4. The two electronic switches 41 are corresponding to the first pressing portion 211 of the first button 21 and the third pressing portion 222 of the second button 22, respectively. The two electronic switches 41 are located at different lines, namely the two electronic switches 41 are unaligned along the left and right direction. In the first preferred embodiment, a front end of the circuit board 4 is closer to the electronic switch 41 arranged on a left side of the circuit board 4 than to the electronic switch 41 arranged on a right side of the circuit board 4. In the concrete implementation, the front end of the circuit board 4 is without being limited to be closer to the electronic switch 41 arranged on the left side of the circuit board 4 than to the electronic switch 41 arranged on the right side of the circuit board 4.

The wheel button 42 is disposed to the front end of the circuit board 4. The wheel button 42 is disposed in the receiving groove 12 of the lower shell 1. The encoder 43 and the micro switch 44 are disposed to two opposite sides of the wheel button 42, respectively. The wheel button 42, the encoder 43 and the micro switch 44 are disposed between the two electronic switches 41. The encoder 43 is used for producing a pulse signal. A computer depends on the pulse signal to judge a rotation direction and a rotation speed of the wheel button 42. When the wheel button 42 is pressed, a shaft of the wheel button 42 triggers the micro switch 44 to execute an input function.

Each electronic switch 41 has a triggering element 411. The two triggering elements 411 of the two electronic switches 41 are partially exposed to two top surfaces of the two electronic switches 41. The two triggering elements 411 of the two electronic switches 41 are located at different lines. The two triggering elements 411 of the two electronic switches 41 are unaligned along the left and right direction. A bottom surface of the first bottom wall 2112 of the first pressing portion 211 of the first button 21 abuts against a top surface of the triggering element 411 of one electronic switch 41. A bottom surface of the third bottom wall 2222 of the third pressing portion 222 of the second button 22 abuts against a top surface of the triggering element 411 of the other electronic switch 41.

Referring to FIG. 1 to FIG. 17, a mouse 200 in accordance with a second preferred embodiment of the present invention is shown. Differences between the mouse 100 in accordance with the first preferred embodiment and the mouse 200 in accordance with the second preferred embodiment are described as follows.

A shape of the second elastic element 32 of the elastic element assembly 3 in accordance with the first preferred embodiment is different from the shape of the second elastic element 32 of the elastic element assembly 3 in accordance with the second preferred embodiment. In the second preferred embodiment, the second elastic element 32 has the second elastic body 320, the second abutting end 321 and an elastic arm 33. The second abutting end 321 and the elastic arm 33 are located at two opposite sides of the second elastic body 320. A front end of the elastic arm 33 of the second elastic element 32 is a multi-bending structure. In the first preferred embodiment, a front end of the flexible arm 322 is a straight structure. In the second preferred embodiment, the free portion of the bottom end of the second elastic body 320 extends downward, then extends frontward, further slantwise extends upward and frontward, later extends frontward and is bent inward and towards the second abutting end 321 to form the elastic arm 33. The elastic arm 33 has a third extending portion 331, a support arm 332 and a bending portion 333. The free portion of the bottom end of the second elastic body 320 extends frontward to form the third extending portion 331. A front end of the third extending portion 331 slantwise extends upward and frontward to form the support arm 332. A front end of the support arm 332 extends frontward, and is bent inward and towards the second abutting end 321 to form the bending portion 333.

One end of the elastic arm 33 abuts against the inner surface of the top wall of the inside of the third pressing portion 222 to generate the resilience force F3. The one end of the elastic arm 33 abuts against the inner surface of the top wall of the third space 2223 of the third pressing portion 222 to generate the resilience force F3. The bending portion 333 abuts against the inner surface of the top wall of the third space 2223 of the third pressing portion 222 to generate the resilience force F3. In the second preferred embodiment, the first downward force F1 is greater than the second downward force F2. The first downward force F1 is equal to the sum of the second downward force F2 and the resilience force F3. The first downward force F1 of the first elastic element 31, the second downward force F2 of the second elastic element 32 and the resilience force F3 of the second elastic element 32 satisfy the following condition: F1=F2+F3. Therefore, when the first button 21 which is the left button and the second button 22 which is the right button of the mouse 100 are located at the different horizontal positions, namely the first button 21 and the second button 22 are unaligned along the left and right direction, the first button 21 and the second button 22 still have the same feedback force, so that the hand feeling of the operator is without being affected.

As described above, the mouse 100 has an innovative structure design, the free end of the second inclining portion 315 of the first abutting end 311 of the first elastic element 31 abuts against the inner surface of the lower wall of the first space 2113 of the first pressing portion 211 to generate the first downward force F1, the one end of the fifth inclining portion 326 of the second abutting end 321 of the second elastic element 32 abuts against the inner surface of the lower wall of the second space 2213 of the second pressing portion 221 to generate the second downward force F2, and the one end of the flexible arm 322 of the second elastic element 32 abuts against the inner surface of the top wall of the third space 2223 of the third pressing portion 222 to generate the resilience force F3, the first downward force F1 is equal to the sum of the second downward force F2 and the resilience force F3. As a result, when the first button 21 which is the left button and the second button 22 which is the right button of the mouse 100 are located at the different horizontal positions, namely the first button 21 and the second button 22 are unaligned along the left and right direction, the first button 21 and the second button 22 still have the same feedback force, so that the hand feeling of the operator is without being affected.

What is claimed is:

1. A mouse, comprising:
   a lower shell;
   an upper shell covered on the lower shell, a middle of the upper shell being spaced from the lower shell to form an accommodating space between the lower shell and the upper shell, a front end of the upper shell having a first button and a second button, a bottom surface of the first button extending downward to form a first pressing portion, a bottom surface of the second button extending downward to form a second pressing portion and a third pressing portion, the front end of the upper shell being closer to the first pressing portion of the first button than to the second pressing portion and the third pressing portion of the second button;
   a first elastic element disposed to a bottom surface of the upper shell, the first elastic element being corresponding to the first button, one end of the first elastic element abutting against a lower wall of an inside of the first pressing portion to generate a first downward force;
   a second elastic element disposed to the bottom surface of the upper shell, the second elastic element being corresponding to the second button, one end of the second elastic element abutting against a lower wall of an inside of the second pressing portion to form a second downward force, the other end of the second elastic element abutting against a top wall of an inside of the third pressing portion to generate a resilience force; and
   a circuit board fastened in the accommodating space, the circuit board being equipped with two electronic switches, the two electronic switches being mounted on two opposite sides of a front end of a top surface of the circuit board, the two electronic switches being corresponding to the first pressing portion and the third pressing portion;
   wherein the first downward force is equal to a sum of the second downward force and the resilience force.

2. The mouse as claimed in claim 1, wherein the upper shell has a grip portion and a main body, the first button and the second button are disposed to two sides of a front end of the grip portion, the main body is disposed to the bottom surface of the first button, the bottom surface of the second button and a bottom surface of the grip portion.

3. The mouse as claimed in claim 2, wherein the main body has two location portions, the first elastic element and the second elastic element are mounted around the two location portions, each location portion has a location shaft and a periphery wall, two opposite sides of a front end of a bottom surface of the main body extend frontward to form two buffering portions, respectively, the two buffering portions are corresponding to the first button and the second button, respectively, the two location portions are disposed to two rear ends of the two buffering portions, a rear end of a bottom surface of each buffering portion of the main body extends downward to form the location shaft and the periphery wall, the location shaft is surrounded by the periphery wall, the periphery wall is spaced a distance from the location shaft.

4. The mouse as claimed in claim 3, wherein the first elastic element has a first elastic body, a first abutting end and a fastening end, the first elastic body is mounted around the location shaft of the location portion of the main body which is disposed to the bottom surface of the first button, a bottom end of the first elastic body has the first abutting end, one end of the first abutting end abuts against the lower wall of the inside of the first pressing portion, a free portion of a top end of the first elastic body extends rearward and is curved frontward to form the fastening end, the fastening end is a U-shaped structure, the fastening end clamps an outside of the periphery wall of the location portion of the main body which is disposed to the bottom surface of the first button, the first abutting end and the fastening end are located at the same side of the first elastic body.

5. The mouse as claimed in claim 4, wherein the first abutting end has a first extending portion, a first inclining portion and a second inclining portion, a free portion of the bottom end of the first elastic body extends frontward to form the first extending portion, the first extending portion extends frontward and penetrates through a front of the periphery wall of the location portion which is disposed to the bottom surface of the first button, one end of the first extending portion slantwise extends frontward and downward to form the first inclining portion, one end of the first inclining portion slantwise extends frontward and downward to form the second inclining portion, the first inclining portion and the second inclining portion are disposed at an outer surface of one location plate which is disposed to the bottom surface of the first button, the inside of the first pressing portion forms a first space penetrating through a rear of the first pressing portion, the second inclining portion is disposed in the first space of the first pressing portion.

6. The mouse as claimed in claim 5, wherein the first pressing portion has a first connecting wall and a first bottom wall, the bottom surface of the first button extends downward to form the first connecting wall, the first connecting wall is a U shape, the first bottom wall is connected with a bottom of the first connecting wall, the first button has the first space surrounded among the first connecting wall, the first bottom wall and the bottom surface of the first button, a free end of the second inclining portion abuts against an inner surface of a lower wall of the first space of the first pressing portion to generate the first downward force, when the first downward force is formed, the free end of the second inclining portion abuts against an inner surface of the first bottom wall of the first pressing portion.

7. The mouse as claimed in claim 6, wherein the second elastic element has a second elastic body, a second abutting end and a flexible arm, the second elastic body is mounted around the location shaft of the location portion which is disposed to the bottom surface of the second button, a top end of the second elastic body has the second abutting end, an inside of the second pressing portion forms a second space penetrating through a rear of the second pressing portion, an inside of the third pressing portion forms a third space penetrating through a rear of the third pressing portion, a tail portion of the second abutting end abuts against an inner surface of a lower wall of the second space of the second pressing portion, a bottom end of the second elastic body extends downward, then extends frontward and further slantwise extends frontward and upward to form the flexible arm, one end of the flexible arm abuts against an inner surface of a top wall of the third space of the third pressing portion, the second abutting end and the flexible arm are disposed to two opposite sides of the second elastic body.

8. The mouse as claimed in claim 7, wherein the second abutting end has a second extending portion, a third inclining portion, a fourth inclining portion and a fifth inclining portion, a free portion of the top end of the second elastic body extends outward and towards the first elastic element to form the second extending portion, the second extending portion is disposed to a rear end of the periphery wall of the location portion of the main body which is disposed to the bottom surface of the second button, a free end of the second extending portion slantwise extends outward and frontward to form the third inclining portion, a front end of the third inclining portion extends frontward and then slantwise extends downward and frontward to form the fourth inclining portion, a front end of the fourth inclining portion slantwise extends frontward and downward to form the fifth inclining portion.

9. The mouse as claimed in claim 8, wherein the second pressing portion has a second connecting wall and a second bottom wall, the bottom surface of the second button extends downward to form the second connecting wall, the second connecting wall is another U shape, the second bottom wall is connected with a bottom of the second connecting wall, the second button has the second space surrounded among the second connecting wall, the second bottom wall and the bottom surface of the second button, the fifth inclining portion is disposed in the second space of the second pressing portion, one end of the fifth inclining portion abuts against the inner surface of the lower wall of the second space of the second pressing portion to generate the second downward force, when the second downward force is formed, the one end of the fifth inclining portion abuts against a top surface of the second bottom wall of the second pressing portion.

10. The mouse as claimed in claim 9, wherein the third pressing portion has a third connecting wall and a third bottom wall, the bottom surface of the second button extends downward to form the third connecting wall, the third connecting wall is still another U shape, the third bottom wall is connected with a bottom of the third connecting wall, the second button has the third space surrounded among the third connecting wall, the third bottom wall and the bottom surface of the second button, the flexible arm penetrates through a bottom surface of the periphery wall of the location portion which is disposed to the bottom surface of the second button, and then the flexible arm is disposed in the third space of the third pressing portion, one end of the flexible arm abuts against the inner surface of the top wall of the third space of the third pressing portion to generate the resilience force.

11. The mouse as claimed in claim 6, wherein the second elastic element has a second elastic body, a second abutting end and an elastic arm, the second elastic body is mounted around the location shaft of the location portion of the main body which is disposed to the bottom surface of the second button, a top end of the second elastic body has the second abutting end, an inside of the second pressing portion forms a second space penetrating through a rear of the second pressing portion, a tail portion of the second abutting end abuts against an inner surface of a lower wall of the second space of the second pressing portion, a free portion of a bottom end of the second elastic body extends downward, then extends frontward, further slantwise extends upward and frontward, later extends frontward and is bent inward and towards the second abutting end to form the elastic arm, one end of the elastic arm abuts against an inner surface of a top wall of the inside of the third pressing portion, the second abutting end and the elastic arm are located at two opposite sides of the second elastic body.

12. The mouse as claimed in claim 11, wherein the elastic arm has a third extending portion, a support arm and a bending portion, the free portion of the bottom end of the second elastic body extends frontward to form the third extending portion, a front end of the third extending portion slantwise extends upward and frontward to form the support arm, a front end of the support arm extends frontward, and is bent inward and towards the second abutting end to form the bending portion.

13. The mouse as claimed in claim 12, wherein the third pressing portion has a third connecting wall and a third bottom wall, the bottom surface of the second button extends downward to form the third connecting wall, the third connecting wall is another U shape, the third bottom wall is connected with a bottom of the third connecting wall, the second button has a third space surrounded among the third connecting wall, the third bottom wall and the bottom surface of the second button, the bending portion abuts against an inner surface of a top wall of the third space of the third pressing portion to generate the resilience force.

14. The mouse as claimed in claim 3, wherein two front ends of the two buffering portions have a plurality of perforations, the plurality of the perforations penetrate through top surfaces and bottom surfaces of the two buffering portions, the plurality of the perforations are corresponding to positions of the first pressing portion, the second pressing portion and the third pressing portion, two perforations which are corresponding to the second button are abreast disposed, the first pressing portion passes through the perforation which is corresponding to the first button, the second pressing portion passes through one perforation which is corresponding to the second button, the third pressing portion passes through the other perforation which is corresponding to the second button.

15. The mouse as claimed in claim 14, wherein two rear ends of two bottom surfaces of the two buffering portions extend downward and frontward to form two location plates, respectively, the two location plates are disposed in front of the two location portions, front ends of the two location plates are disposed in the first pressing portion and the second pressing portion, respectively, the two location plates are disposed in the two perforations which are corresponding to the first pressing portion and the second pressing portion, respectively.

16. The mouse as claimed in claim 2, wherein a bottom surface of the main body extends downward to form a location pillar, a rear end of the lower shell has a location hole penetrating through a bottom surface of the lower shell, a quantity of the location pillar is corresponding to a quantity of the location hole, the location pillar is fastened in the location hole.

17. The mouse as claimed in claim 2, wherein a rear end of the first button extends rearward to form a first connecting portion, the first connecting portion is connected with the bottom surface of the grip portion, the first connecting portion is disposed between the grip portion and the main body, a rear end of the second button extends rearward to form a second connecting portion, the second connecting portion is connected with the bottom surface of the grip portion, the second connecting portion is disposed between the grip portion and the main body.

18. The mouse as claimed in claim 1, wherein the first downward force is greater than the second downward force.

19. A mouse, comprising:

a lower shell;

an upper shell covered on the lower shell, a middle of the upper shell being spaced from the lower shell to form an accommodating space between the lower shell and the upper shell, a front end of the upper shell having a first button and a second button, the upper shell having a main body, the main body being disposed to a bottom surface of the first button and a bottom surface of the second button, the bottom surface of the first button extending downward to form a first pressing portion, the bottom surface of the second button extending downward to form a second pressing portion and a third pressing portion, an inside of the first pressing portion forming a first space penetrating through a rear of the first pressing portion, an inside of the second pressing portion forming a second space penetrating through a rear of the second pressing portion, and an inside of the third pressing portion forming a third space penetrating through a rear of the third pressing portion, the front end of the upper shell being closer to the first pressing portion of the first button than to the second pressing portion and the third pressing portion;

a first elastic element disposed to a bottom surface of the upper shell, the first elastic element being corresponding to the first button, the first elastic element having a first elastic body, the first elastic body being mounted under one side of the main body which is disposed to the bottom surface of the first button, a bottom end of the first elastic body having a first abutting end, one end of the first abutting end abutting against an inner surface of a lower wall of the first space of the first pressing portion to generate a first downward force;

a second elastic element disposed to the bottom surface of the upper shell, the second elastic element being corresponding to the second button, the second elastic element having a second elastic body, the second elastic body being mounted under the other side of the main body which is disposed to the bottom surface of the second button, a top end of the second elastic body having a second abutting end, a free portion of a bottom end of the second elastic body extending downward, then extending frontward and further slantwise extending frontward and upward to form a flexible arm, a tail portion of the second abutting end abutting against an inner surface of a lower wall of the second space of the second pressing portion to generate a second downward force, one end of the flexible arm abutting against an inner surface of a top wall of the third space of the third pressing portion to generate a resilience force; and a circuit board fastened in the accommodating space, the circuit board being equipped with two electronic switches, the two electronic switches being mounted on two opposite sides of a front end of a top surface of the circuit board, the two electronic switches being corresponding to the first pressing portion and the third pressing portion;

wherein the first downward force is equal to a sum of the second downward force and the resilience force.

20. A mouse, comprising:

a lower shell;

an upper shell covered on the lower shell, a middle of the upper shell being spaced from the lower shell to form an accommodating space between the lower shell and the upper shell, a front end of the upper shell having a first button and a second button, the upper shell having a main body, the main body being disposed to a bottom surface of the first button and a bottom surface of the second button, the bottom surface of the first button extending downward to form a first pressing portion, the bottom surface of the second button extending downward to form a second pressing portion and a third pressing portion, an inside of the first pressing portion forming a first space penetrating through a rear of the first pressing portion, an inside of the second pressing portion forming a second space penetrating through a rear of the second pressing portion, and an inside of the third pressing portion forming a third space penetrating through a rear of the third pressing portion, the front end of the upper shell being closer to the first pressing portion of the first button than to the second pressing portion and the third pressing portion;

a first elastic element disposed to a bottom surface of the upper shell, the first elastic element being corresponding to the first button, the first elastic element having a first elastic body, the first elastic body being mounted under one side of the main body which is disposed to the bottom surface of the first button, a bottom end of the first elastic body having a first abutting end, one end of the first abutting end abutting against an inner surface of a lower wall of the first space of the first pressing portion to generate a first downward force;

a second elastic element disposed to the bottom surface of the upper shell, the second elastic element being corresponding to the second button, the second elastic element having a second elastic body, the second elastic body being mounted under the other side of the main body which is disposed to the bottom surface of the second button, a top end of the second elastic body having a second abutting end, a free portion of a bottom end of the second elastic body extending downward, then extending frontward, further slantwise extending upward and frontward, later extending frontward and being bent inward and towards the second abutting end to form an elastic arm, a tail portion of the second abutting end abutting against an inner surface of a lower wall of the second space of the second pressing portion to generate a second downward force, one end of the elastic arm abutting against an inner surface of a top wall of the third space of the third pressing portion to generate a resilience force; and a circuit board fastened in the accommodating space, the circuit board being equipped with two electronic switches, the two electronic switches being mounted on two opposite sides of a front end of a top surface of the circuit board, the two electronic switches being corresponding to the first pressing portion and the third pressing portion;

wherein the first downward force is equal to a sum of the second downward force and the resilience force.

* * * * *